US012658446B2

(12) United States Patent
Lim et al.

(10) Patent No.: US 12,658,446 B2
(45) Date of Patent: Jun. 16, 2026

(54) ALL-SOLID-STATE BATTERY INCLUDING SELF-STANDING SHEET LAYER

(71) Applicants: Hyundai Motor Company, Seoul (KR); Kia Corporation, Seoul (KR); Foundation of Soongsil University-Industry Cooperation, Seoul (KR)

(72) Inventors: Jae Min Lim, Suwon (KR); Hee Soo Kang, Seoul (KR); Young Jin Nam, Seoul (KR); Soon Chul Byun, Yongin (KR); Young Jin Jeong, Seoul (KR); Gyo Sik Kim, Ansan (KR); Hae Joo Kim, Yongin (KR); Jeong Yun Lee, Goyang (KR)

(73) Assignees: Hyundai Motor Company, Seoul (KR); Kia Corporation, Seoul (KR); Foundation of Soongsil University-Industry Cooperation, Seoul (KR)

( * ) Notice: Subject to any disclaimer, the term of this patent is extended or adjusted under 35 U.S.C. 154(b) by 498 days.

(21) Appl. No.: 18/143,126

(22) Filed: May 4, 2023

(65) Prior Publication Data

US 2024/0079597 A1     Mar. 7, 2024

(30) Foreign Application Priority Data

Aug. 23, 2022     (KR) ......................... 10-2022-0105162

(51) Int. Cl.
H01M 4/62      (2006.01)
H01M 4/36      (2006.01)
H01M 10/0562      (2010.01)

(52) U.S. Cl.
CPC .......... H01M 4/625 (2013.01); H01M 4/366 (2013.01); H01M 10/0562 (2013.01)

(58) Field of Classification Search
CPC ... H01M 4/625; H01M 4/366; H01M 10/0562
See application file for complete search history.

(56) References Cited

U.S. PATENT DOCUMENTS

2014/0017552 A1* 1/2014 Wang .................... H01M 4/663
977/734
2018/0047519 A1* 2/2018 Tour ...................... H01M 4/483
(Continued)

FOREIGN PATENT DOCUMENTS

CN      107743645 B      10/2020
JP      H 09-139209 A      5/1997
(Continued)

OTHER PUBLICATIONS

M. Ye et al., "Graphene-winged carbon nanotubes as high-performance lithium-ion batteries anode with super-long cycle life", Journal of Power Sources, vol. 305, pp. 106-114 (2016).
(Continued)

*Primary Examiner* — Olatunji A Godo
(74) *Attorney, Agent, or Firm* — Fox Rothschild LLP

(57) ABSTRACT

Proposed is an all-solid-state battery including a self-standing sheet layer positioned on a negative electrode current collector. The all-solid-state battery may include the negative electrode current collector, the self-standing sheet layer positioned on the negative electrode current collector, a solid electrolyte layer positioned on the sheet layer, a positive electrode active material layer positioned on the solid electrolyte layer, and a positive electrode current collector positioned on the positive electrode active material layer. The sheet layer contains carbon nanotubes.

15 Claims, 10 Drawing Sheets

100

(56) References Cited

U.S. PATENT DOCUMENTS

| | | |
|---|---|---|
| 2018/0342357 A1 | 11/2018 | Nguyen et al. |
| 2023/0246310 A1* | 8/2023 | Lu ........................ H01M 50/543 |
| | | 429/210 |

FOREIGN PATENT DOCUMENTS

| | | | |
|---|---|---|---|
| JP | 2011-249673 A | 12/2011 |
| KR | 10-2019-0031173 A | 3/2019 |
| KR | 10-2020-0035885 A | 4/2020 |
| KR | 10-2020-0056039 A | 5/2020 |
| WO | 2014/175524 A1 | 10/2014 |
| WO | 2020/232196 A1 | 11/2020 |

OTHER PUBLICATIONS

X. Wu et al., "Recent progress in the synthesis of graphene/CNT composites and the energy-related applications", Journal of Materials Science & Technology, vol. 55, pp. 16-34 (2020).

D.V. Kosynkin et al., "Longitudinal unzipping of carbon nanotubes to form graphene nanoribbons", Nature, vol. 458, pp. 872-877 (2009).

J. Jiao et al., "First-principles calculations on lithium and sodium adsorption on graphene edges", Electrochimica Acta, vol. 282, pp. 205-212 (2018).

D. Chen et al., "Crumpled graphene balls as rapid and efficient adsorbents for removal of copper ions", Journal of Colloid and Interface Science, vol. 530, pp. 46-51 (2018).

D.H.S. Tan et al., "Elucidating Reversible Electrochemical Redox of Li6PH5Cl Solid Electrolyte", ACS Energy Letters, vol. 4, pp. 2418-2427 (2019).

* cited by examiner

100

ALL-SOLID-STATE BATTERY INCLUDING SELF-STANDING SHEET LAYER

CROSS REFERENCE TO RELATED APPLICATION

The present application claims priority to Korean Patent Application No. 10-2022-0105162, filed Aug. 23, 2022, the entire contents of which is incorporated herein for all purposes by this reference.

TECHNICAL FIELD

The present disclosure relates to an all-solid-state battery including a self-standing sheet layer positioned on a negative electrode current collector.

BACKGROUND

An all-solid-state battery is a three-layer laminate composed of a positive electrode active material layer bonded to a positive electrode current collector, a negative electrode active material layer bonded to a negative electrode current collector, and a solid electrolyte layer disposed between the positive electrode active material layer and the negative electrode active material layer.

Typically, the negative electrode active material layer includes a solid electrolyte allowing migration of lithium ions as well as negative active materials such as graphite therethrough. Generally, solid electrolytes have higher specific gravity than liquid electrolytes. For this reason, all-solid-state batteries using a solid electrolyte have lower energy density than lithium-ion batteries using a liquid electrolyte.

To overcome such a problem and increase the energy density of all-solid-state batteries, research on the use of lithium metal as a negative electrode is in progress. However, for commercialization of all-solid-state batteries, there are still many obstacles to be overcome, including technological issues such as interfacial bonding and growth of lithium dendrites and industrial issues such as price and large-scale optimization.

Recently, research has been conducted on a storage-type anode-less all-solid-state battery that has no anode so that lithium ions (Li+) are directly deposited on an anode current collector.

SUMMARY

Provided herein, inter alia, is an all-solid-state battery having excellent Coulombic efficiency.

Also provided is an all-solid-state battery having excellent energy density.

Further provided herein is an all-solid-state battery capable of inhibiting the formation of lithium dendrites.

Objectives of the present disclosure are not limited to the objectives mentioned above. The above and other objectives of the present disclosure will become more apparent from the following description, and will be realized by the means of the appended claims, and combinations thereof.

In an aspect, provided is an all-solid-state battery including a negative electrode current collector, a sheet layer positioned on the negative electrode current collector, the sheet layer including carbon nanotubes, a solid electrolyte layer positioned on the sheet layer, a positive electrode active material layer positioned on the solid electrolyte layer, and a positive electrode current collector positioned on the positive electrode active material layer.

The sheet layer may be self-standing type.

The sheet layer may have a network structure formed by the carbon nanotubes and including pores.

The sheet layer may have a porosity in a range of about 30% to 80%.

The sheet layer may include a first layer and a second layer. The first layer may be disposed on the negative electrode current collector and include unzipped carbon nanotubes. The second layer may be disposed on the first layer and include raw carbon nanotubes.

When the all-solid-state battery is charged, lithium may be deposited and stored in the first layer.

The first layer may have a greater specific surface area than the second layer.

The first layer may have a specific surface area in a range of about 200 $m^2/g$ to 400 $m^2/g$.

The second layer may have a specific surface area in a range of about 50 $m^2/g$ to 200 $m^2/g$.

The first layer may have a greater lithiophilicity than the second layer.

The second layer may have higher a peak intensity ratio of G band to D band (IG/ID) based on Raman spectroscopy than the first layer.

The second layer may have a peak intensity ratio of G band to D band (IG/ID) based on Raman spectroscopy in a range of about 4 to 7.

The first layer may have a peak intensity ratio of G band to D band (IG/ID) based on Raman spectroscopy in a range of about 1 to 2.

The first layer may have a thickness in a range of about 0.1 μm to 100 μm.

The second layer may have a thickness in a range of about 0.1 μm to 100 μm.

The sheet layer may not include a binder.

In another aspect, provided is a vehicle including the all-solid-state battery as described herein.

According to various exemplary embodiments of the present disclosure, an all-solid-state battery having excellent Coulombic efficiency can be obtained.

According to various exemplary embodiments of the present disclosure, an all-solid-state battery having excellent energy density can be obtained.

According to various exemplary embodiments of the present disclosure, an all-solid-state battery capable of inhibiting the formation of lithium dendrites can be obtained.

Other aspects of the invention are disclosed infra.

DETAILED DESCRIPTION

Figure 1:
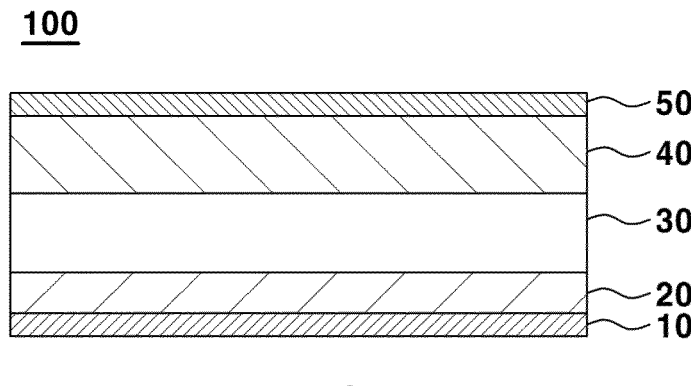
FIG. 1 shows an all-solid-state battery according to an exemplary embodiment of the present disclosure.

Above objectives, other objectives, features, and advantages of the present disclosure will be readily understood from the following preferred embodiments associated with the accompanying drawings. However, the present disclosure is not limited to the embodiments described herein and may be embodied in other forms. The embodiments described herein are provided so that the disclosure can be made thorough and complete and that the spirit of the present disclosure can be fully conveyed to those skilled in the art. Throughout the drawings, like elements are denoted by like reference numerals. In the accompanying drawings, the dimensions of the structures are larger than actual sizes for clarity of the present disclosure. Terms used in the specification, "first", "second", etc., may be used to describe various components, but the components are not to be construed as being limited to the terms. These terms are used only for the purpose of distinguishing a component from another component. For example, without departing from the scope of the present disclosure, a first component may be referred as a second component, and a second component may be also referred to as a first component. The singular expression includes the plural expression unless the context clearly indicates otherwise. It will be further understood that the terms "comprises", "includes", or "has" when used in this specification specify the presence of stated features, regions, integers, steps, operations, elements and/or components, but do not preclude the presence or addition of one or more other features, regions, integers, steps, operations, elements, components and/or combinations thereof. It will also be understood that when an element such as a layer, film, area, or sheet is referred to as being "on" another element, it can be directly on the other element, or intervening elements may be present therebetween. Similarly, when an element such as a layer, film, area, or sheet is referred to as being "under" another element, it can be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others, and thus should be understood to be modified by the term "about" in all cases.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated. In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

A term "all-solid-state battery" as used herein refers to a rechargeable secondary battery that includes an electrolyte in a solid state, e.g., gel or polymer (cured), which may include an ionomer and other electrolytic components for transferring ions between the electrodes of the battery.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

FIG. 1 shows an all-solid-state battery according to an exemplary embodiment of the present disclosure. As shown in FIG. 1, the all-solid-state battery 100 may be a battery in which a negative electrode current collector 10, a sheet layer 20, a solid electrolyte layer 30, a positive electrode active material layer 40, and a positive electrode current collector 50 are sequentially laminated.

The negative electrode current collector 10 may be an electrically conductive plate-shaped substrate. Specifically, the negative electrode current collector 10 may have a form of a sheet, a thin film, or a foil.

The negative electrode current collector 10 may include a material that does not react with lithium. Specifically, the negative electrode current collector 10 may include at least one selected from the group consisting of Ni, Cu, stainless steel (SUS), and combinations thereof.

The sheet layer 20 may include a self-standing thin film made of carbon nanotubes. The carbon nanotubes are arranged to form a network structure including pores in the sheet layer 20.

The term "self-standing" of the sheet layer 20 may mean that the sheet layer 20 can maintain a form and structure thereof regardless of the presence of other components.

When the all-solid-state battery 100 is charged, lithium ions are released from the positive electrode active material layer 40. The lithium ions move to the sheet layer 20 through the solid electrolyte layer 30 and react with electrons on a surface of the carbon nanotube. As a result, the lithium ions are deposited and stored in the form of lithium metal. When the lithium metal fills all the pores of the sheet layer 20, a series of layers including the lithium metal may be formed between the sheet layer 20 and the negative electrode current collector 10. The sheet layer 20 may have a porosity in a range of about 30% to 80% or about 30% to 60%. When the sheet layer 20 has a porosity of less than about 30%, space for storing the lithium metal may be insufficient. As a result, the layer including the lithium metal positioned between the sheet layer 20 and the negative electrode current collector 10 may have excessively large thickness, thereby forming dead lithium. In addition, the degree of volume expansion may increase, thereby deteriorating durability of the all-solid-state battery 100. When the sheet layer 20 has a porosity of greater than about 80%, mechanical properties of the sheet layer 20 may be deteriorated. As a result, it may be difficult to maintain the structure of the sheet layer 20.

On the other hand, when the lithium metal is deposited and stored throughout the sheet layer 20, the lithium metal may come into contact with the solid electrolyte layer 30. As a result, side reactions may occur. In addition, lithium dendrites may penetrate the solid electrolyte layer 30, thereby causing short-circuiting in the all-solid-state battery 100. The present disclosure is characterized in that the sheet layer 20 is formed of a double-layer or a multilayer, of which each layer has different properties, to prevent the above problems.

Figure 2:
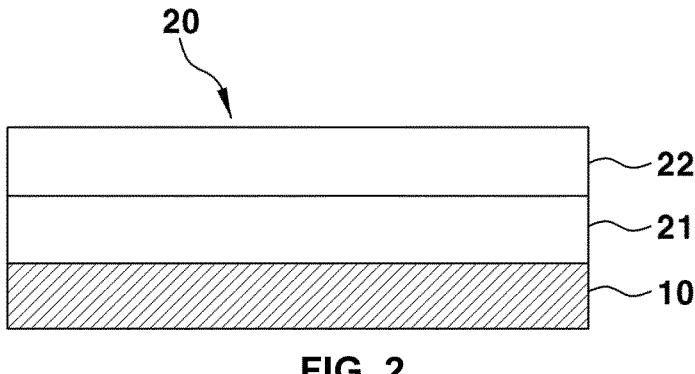
FIG. 2 shows a sheet layer according to an exemplary embodiment of the present disclosure.

FIG. 2 shows a sheet layer 20 according to an exemplary embodiment of the present disclosure. The sheet layer 20 may include a first layer 21 and a second layer 22. The first layer 21 is positioned on the negative electrode current collector 10 and contains unzipped carbon nanotubes (CNTs). The second layer 22 is positioned on the first layer 21 and contains raw carbon nanotubes (CNTs).

The first layer 21 includes the unzipped CNTs and has a large specific surface area and high lithiophilicity.

Figure 3A:
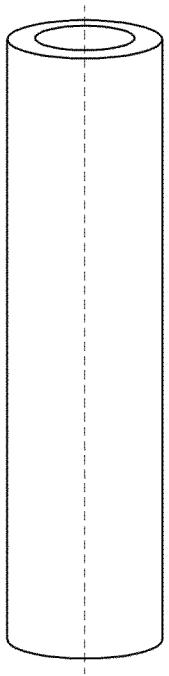
FIG. 3A shows an exemplary raw carbon nanotube.
Figure 3B:
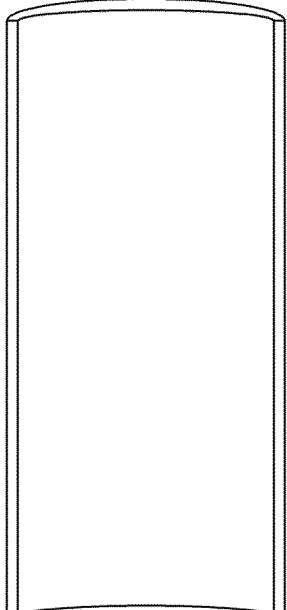
FIG. 3B shows an exemplary an unzipped carbon nanotube.
Figure 3C:
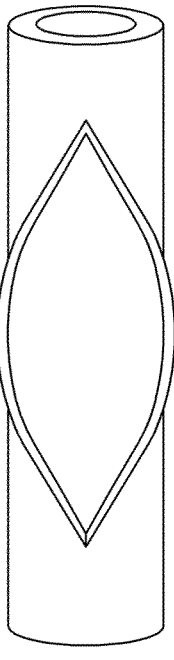
FIG. 3C shows an exemplary unzipped carbon nanotube.

FIGS. 3A to 3C show exemplary structures of the unzipped CNTs. The "unzipped CNTs" may be obtained by longitudinally opening raw CNTs. FIG. 3A illustrates a raw CNT. The term "longitudinally opening a raw CNT" may mean that the raw CNT is fully or partially opened along the longitudinal axis. The unzipped CNTs may be fully opened as illustrated in FIG. 3B or partially opened as illustrated in FIG. 3C.

A manufacturing method of the unzipped CNT is not particularly limited. For example, the unzipped CNT may be obtained by causing an unzipping reaction along the longitudinal direction of the raw CNTs after the oxygen-containing functional group substitution of the raw CNTs. Examples of the oxygen-containing functional group may include a hydroxyl group, a C—O group, a C═O group, an —O—CO— group, and the like.

Since the unzipped CNTs are obtained by opening the raw CNTs, specific surface area of the unzipped CNT is larger than that of the raw CNT. As a result, a specific surface area of the first layer 21 may be larger than that of the second layer 22. The first layer 21 may have a specific surface area in a range of about 200 m$^2$/g to 400 m$^2$/g. The second layer may have a specific surface area in a range of about 50 m$^2$/g to 200 m$^2$/g.

The unzipped CNT may have superior lithiophilicity to the raw CNT because the oxygen-containing functional groups are substituted during the manufacturing process thereof.

As a result, when the all-solid-state battery 100 is charged, the lithium metal is mainly deposited and stored in the first layer 21. Since the first layer 21 has a large specific surface area and thus a low current density per unit area, the formation of lithium dendrites can be effectively inhibited.

The second layer 22 has high crystallinity and strength due to the raw CNTs. Therefore, side reactions may not occur even when the second layer 22 comes into contact with the solid electrolyte layer 30. In addition, the second layer 22 may prevent lithium dendrites from growing along the direction toward the solid electrolyte layer 30 from the first layer 21.

The raw CNTs may be obtained as synthesized. The term "as synthesized" may mean that carbon nanotubes are not subjected to additional fabrication, treatment, process, and the like after being synthesized. For example, when synthesizing and growing the carbon nanotubes, an assembly of the carbon nanotubes may be made into a sheet form and the resultant product may be used as the second layer 22 as it is.

The second layer 22 may have higher crystallinity than the first layer 21. The second layer 22 may have a greater peak intensity ratio of G band to D band ($I_G/I_D$) based on Raman spectroscopy than the first layer 21. The second layer 22 may have a peak intensity ratio ($I_G/I_D$) in a range of about 4 to 7. The first layer 21 may have a peak intensity ratio ($I_G/I_D$) in a range of about 1 to 2.

Each of the first layer 21 and the second layer 22 may be a monolayer structure or a multilayer structure. When the first layer 21 and the second layer 22 are each independently a multilayer structure, the total thickness of each of the first layer 21 and the second layer 22 may be the same as the overall thickness of a monolayer structure thereof, and the number of layers in the multilayer structure is not particularly limited. For example, the number of layers may be two, three, or four.

Each of the first layer 21 and the second layer 22 may have a thickness in a range of about 0.1 μm to 100 μm. When the first layer 21 has a thickness of less than about 0.1 μm, lithium metal may be insufficiently deposited and stored. When the second layer 22 has a thickness of less than about 0.1 μm, it may be difficult to inhibit the growth of lithium dendrites. In addition, when each of the first layer 21 and the second layer 22 has a thickness of greater than about 100 μm, the energy density per volume may unnecessarily increase.

Since the sheet layer 20 is made of a self-standing thin film containing the carbon nanotubes, additional components such as a binder may not be included. The binder may inhibit conduction of lithium ions and fill the pores, thereby reducing space where the lithium metal can be deposited. Therefore, preferably, the binder is not used.

The solid electrolyte layer 30 may include a solid electrolyte having lithium ion conductivity.

The solid electrolyte may include at least one selected from the group consisting of an oxide-based solid electrolyte, a sulfide-based solid electrolyte, a polymer electrolyte, and combinations thereof. However, preferably, a sulfide-based solid electrolyte having a high lithium ion conductivity is used. The sulfide-based solid electrolyte is not particularly limited. Examples of the sulfide-based solid electrolyte may include $Li_2S—P_2S_5$, $Li_2S—P_2S_5—LiI$, $Li_2S—P_2S_5—LiCl$, $Li_2S—P_2S_5—LiBr$, $Li_2S—P_2S_5—Li_2O$, $Li_2S—P_2S_5—Li_2O—LiI$, $Li_2S—SiS_2$, $Li_2S—SiS_2—LiI$, $Li_2S—SiS_2—LiBr$, $Li_2S—SiS_2—LiCl$, $Li_2S—SiS_2—B_2S_3—LiI$, $Li_2S—SiS_2—P_2S_5—LiI$, $Li_2S—B_2S_3$, $Li_2S—P_2S_5—Z_mS_n$ (where m and n are each independently a positive integer, and Z is one of Ge, Zn, and Ga), $Li_2S—GeS_2$, $Li_2S—SiS_2—Li_3PO_4$, $Li_2S—SiS_2—Li_xMO_y$ (where x and y are each independently a positive integer, and M is one of P, Si, Ge, B, Al, Ga, and In), $Li_{10}GeP_2S_{12}$, and the like.

Examples of the oxide-based solid electrolyte may include perovskite-type LLTO ($Li_{3x}La_{2/3−x}TiO_3$), phosphate-based NASICON-type LATP ($Li_{1+x}Al_xTi_{2−x}(PO_4)_3$), and the like.

Examples of the polymer electrolyte may include a gel polymer electrolyte, a solid polymer electrolyte, and the like.

The positive electrode active material layer 40 may include a positive electrode active material, a solid electrolyte, a conductive additive, a binder, and the like.

The positive electrode active material is configured to reversibly store and release lithium ions. The positive electrode active material may include an oxide active material or a sulfide active material.

The oxide active material may include a rock-salt-layer-type active material, such as $LiCoO_2$, $LiMnO_2$, $LiNiO_2$, $LiVO_2$, $Li_{1+x}Ni_{1/3}Co_{1/3}Mn_{1/3}O_2$, etc., a spinel-type active material, such as $LiMn_2O_4$, $Li(Ni_{0.5}Mn_{1.5})O_4$, etc., an inversed-spinel-type active material, such as $LiNiVO_4$, $LiCoVO_4$, etc., an olivine-type active material, such as $LiFePO_4$, $LiMnPO_4$, $LiCoPO_4$, $LiNiPO_4$, etc., a silicon-containing active material, such as $Li_2FeSiO_4$, $Li_2MnSiO_4$, etc., a rock-salt-layer-type active material in which a part of transition metal is substituted with dissimilar metal, such as $LiNi_{0.8}Co_{(0.2−x)}Al_xO_2(0<x<0.2)$, a spinel-type active material in which a part of transition metal is substituted with dissimilar metal, such as $Li_{1+x}Mn_{2−x−y}M_yO_4$(M is at least one of Al, Mg, Co, Fe, Ni, and Zn, and $0<x+y<2$), and a lithium titanate, such as $Li_4Ti_5O_{12}$ and the like.

Examples of the sulfide active material may include a copper Chevrel, an iron sulfide, a cobalt sulfide, a nickel sulfide, and the like.

The solid electrolyte may include an oxide solid electrolyte or a sulfide solid electrolyte. However, preferably, a sulfide-based solid electrolyte having a high lithium ion conductivity is used. The sulfide-based solid electrolyte is not particularly limited. Examples of the sulfide-based solid electrolyte may include $Li_2S—P_2S_5$, $Li_2S—P_2S_5—LiI$, $Li_2S—P_2S_5—LiCl$, $Li_2S—P_2S_5—LiBr$, $Li_2S—P_2S_5—Li_2O$, $Li_2S—P_2S_5—Li_2O—LiI$, $Li_2S—SiS_2$, $Li_2S—SiS_2—LiI$, $Li_2S—SiS_2—LiBr$, $Li_2S—SiS_2—LiCl$, $Li_2S—SiS_2—B_2S_3—LiI$, $Li_2S—SiS_2—P_2S_5—LiI$, $Li_2S—B_2S_3$, $Li_2S—P_2S_5—Z_mS_n$ (where m and n are each independently a positive integer, and Z is one of Ge, Zn, and Ga), $Li_2S—GeS_2$, $Li_2S—SiS_2—Li_3PO_4$, $Li_2S—SiS_2—Li_xMO_y$ (where x and y are each independently a positive integer, and M is one of P, Si, Ge, B, Al, Ga, and In), $Li_{10}GeP_2S_{12}$, or the like.

Examples of the conductive additive may include carbon black, conducting graphite, ethylene black, graphene, and the like.

Examples of the binder may include butadiene rubber (BR), nitrile butadiene rubber (NBR), hydrogenated nitrile butadiene rubber (HNBR), polyvinylidene fluoride (PVDF), polytetrafluoroethylene (PTFE), carboxymethyl cellulose (CMC), and the like.

The positive electrode current collector 50 may include an electrically conductive plate-shaped substrate. The positive electrode current collector 50 may include an aluminum foil.

EXAMPLE

Hereinafter, the present disclosure will be described in more detail through specific examples. The following examples are only examples to help the understanding of the present disclosure, and the scope of the present disclosure is not limited thereto.

Preparation Example 1

A carbon precursor solution containing acetone and ethylene glycol, ferrocene as a catalyst precursor, and thiophene as an activator were injected into a heated vertical synthesis furnace at a constant rate with hydrogen gas as a carrier gas to synthesize carbon nanotubes. When the starting materials were supplied to the synthesis furnace, iron generated by the decomposition of ferrocene and sulfur generated by the decomposition of thiophene combined to produce liquid iron sulfide. Carbon generated by the decomposition of the carbon precursor diffused into the iron sulfide. As the iron sulfide was saturated with the carbon, carbon nanotubes grew. When the starting materials were continuously injected, the carbon nanotubes formed an assembly. This assembly was wound on a roller or the like to obtain a carbon nanotube sheet.

Figure 4A:
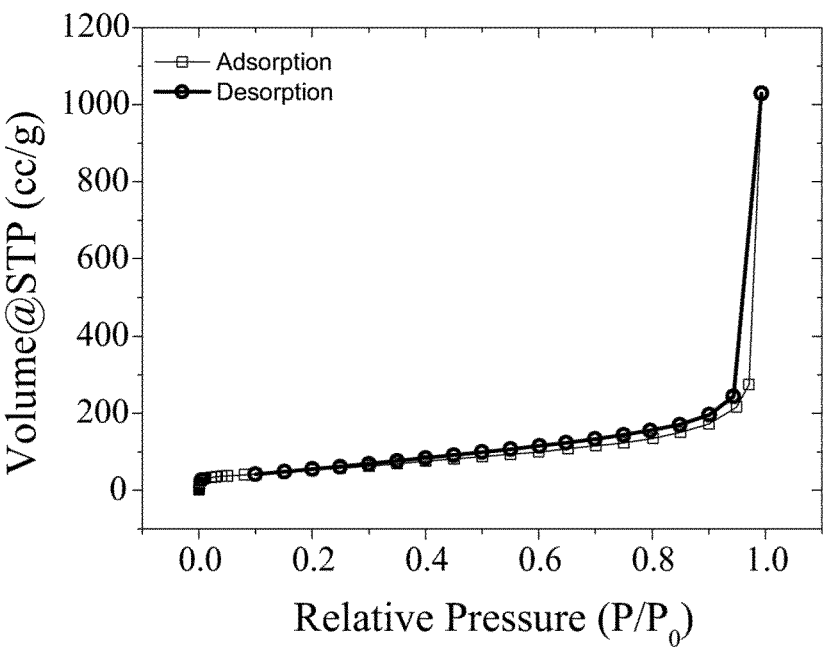
FIG. 4A shows the specific surface area of a second layer according to Preparation Example 1.
Figure 4B:
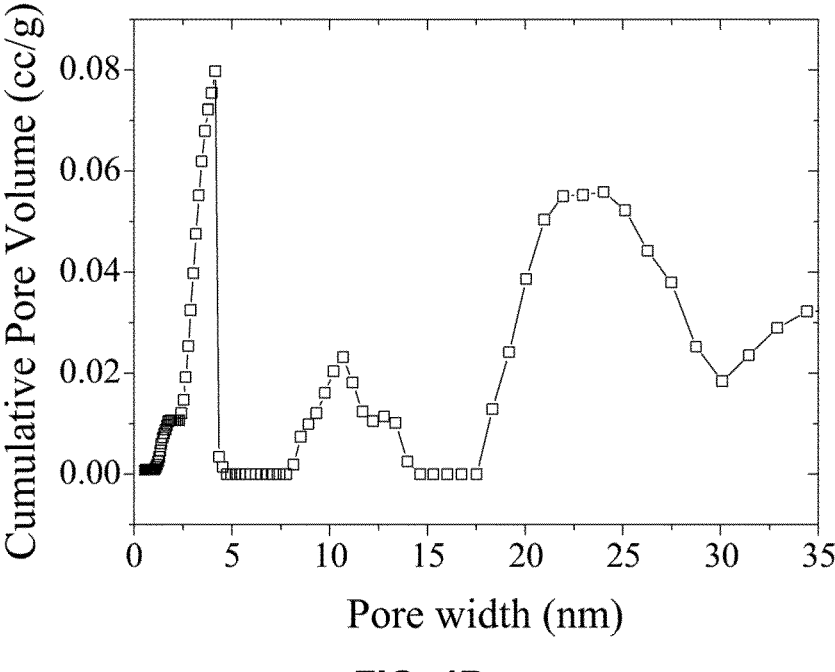
FIG. 4B shows a pore size distribution curve of a second layer according to Preparation Example 1.
Figure 4C:
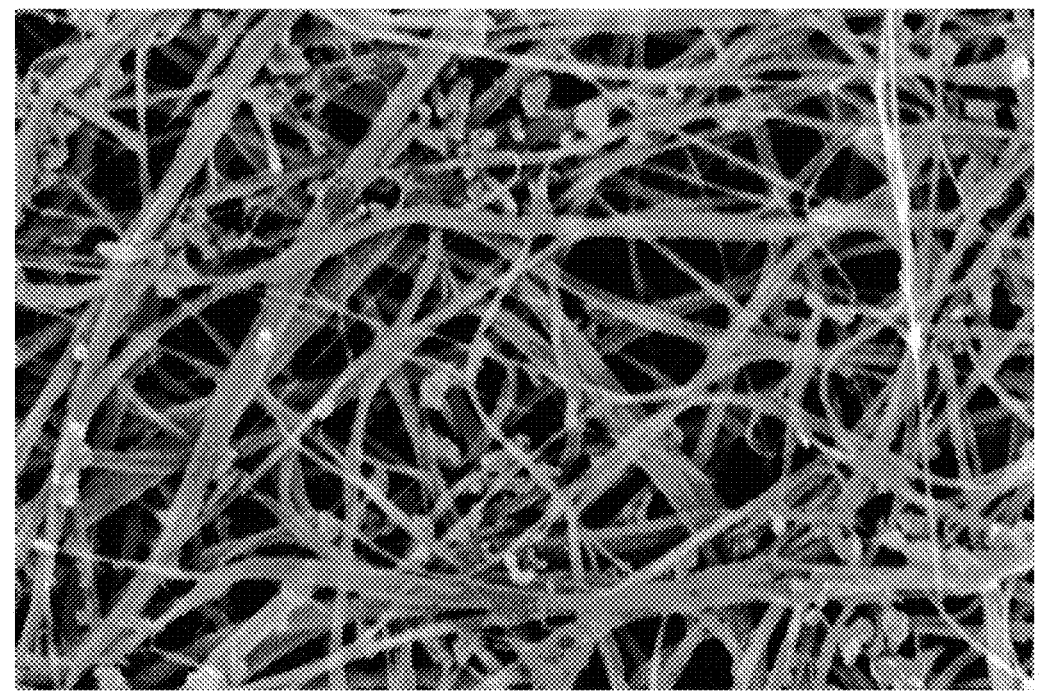
FIG. 4C shows scanning electron microscope (SEM) for a surface of a second layer according to Preparation Example 1.

The sheet may be used as a second layer including raw carbon nanotubes (CNTs). FIG. 4A is a graph showing the analysis results of the specific surface area of the second layer prepared according to Preparation Example 1. FIG. 4B is a pore size distribution curve of the second layer prepared according to Preparation Example 1. FIG. 4C is a scanning electron microscope (SEM) surface analysis result for the second layer prepared according to Preparation Example 1. As shown in FIG. 4C, in the second layer, the raw CNTs were arranged to form a network structure having pores. The specific surface area and pore volume of the second layer are shown in Table 1 below.

Preparation Example 2

The sheet according to Preparation Example 1 was immersed in sulfuric acid ($H_2SO_4$) having a purity of 95% for 12 hours, and about 300 parts by weight of potassium permanganate ($KMnO_4$) per 100 parts by weight of the sheet was added thereto. An oxygen-containing functional group generated through a reaction between the potassium permanganate and the sulfuric acid attached to carbon nanotubes in the sheet. As a result, artificial defects occurred along the longitudinal direction of the carbon nanotubes. After performing the reaction for 1 hour at about 25° C., the carbon nanotubes were heated in an oil bath at a temperature of about 80° C. for about 1 hour, and then the opening reaction ended. Hydrogen peroxide was added thereto to remove manganese dioxide ($MnO_2$) that may be precipitated during a drying process. The sheet was washed with 0.1 M of an aqueous sodium hydroxide solution and distilled water and then lyophilized to obtain the target sheet.

Figure 5A:
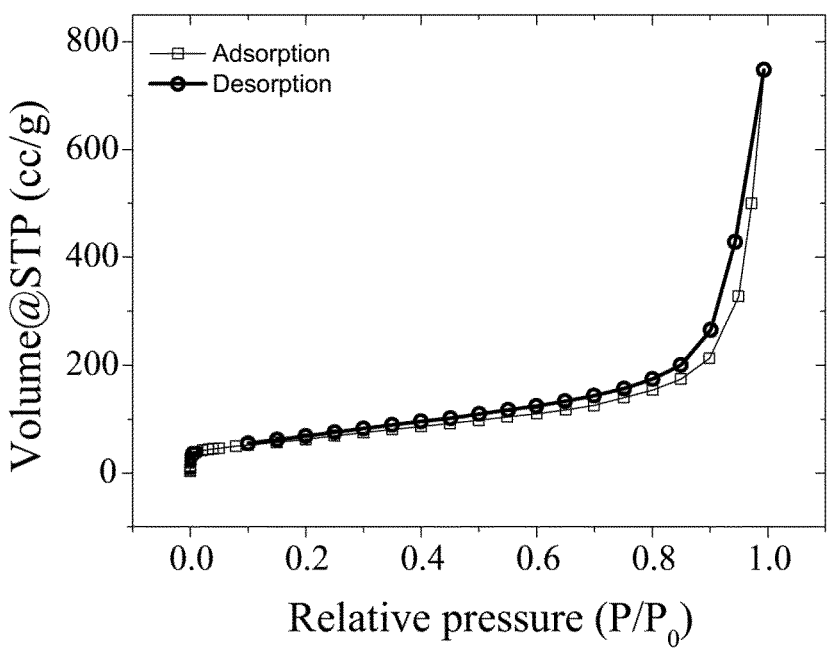
FIG. 5A shows the specific surface area of a first layer according to Preparation Example 2.
Figure 5B:
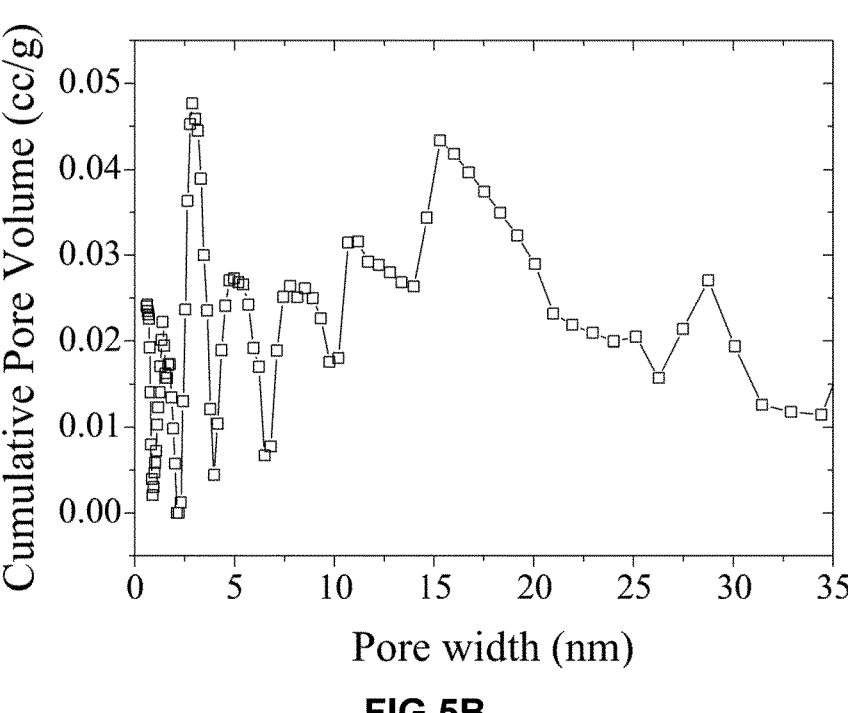
FIG. 5B shows a pore size distribution curve of a first layer according to Preparation Example 2.
Figure 5C:
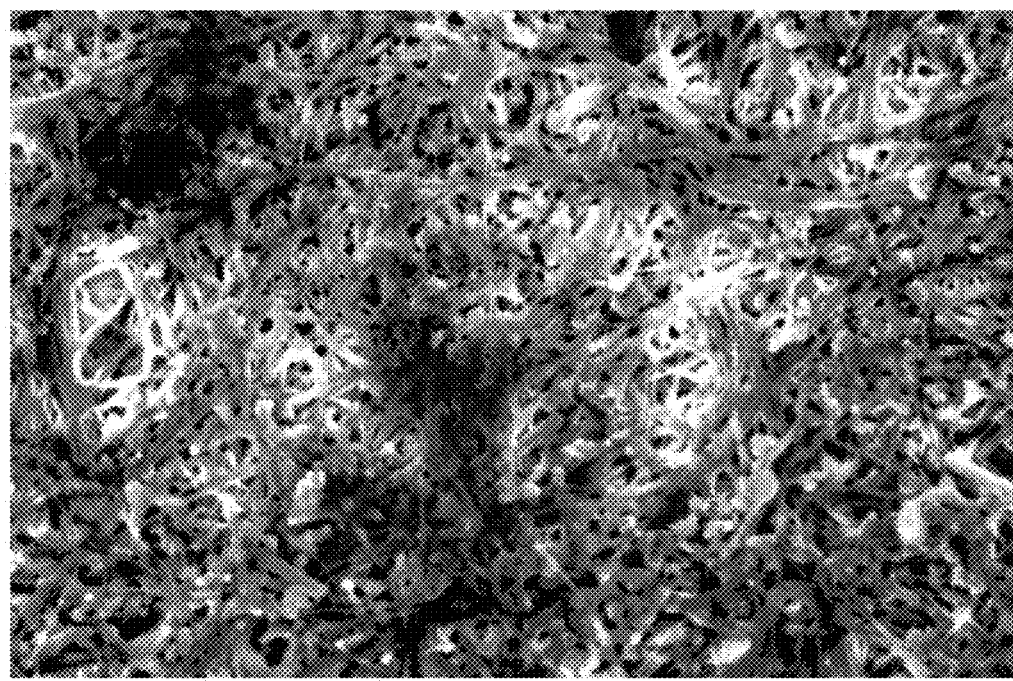
FIG. 5C shows an SEM analysis result for a surface of a first layer according to Preparation Example 2.

The sheet may be used as a first layer including unzipped carbon nanotubes (CNTs). FIG. 5A is a graph showing the analysis results of the specific surface area of the first layer prepared according to Preparation Example 2. FIG. 5B is a pore size distribution curve of the first layer prepared according to Preparation Example 2. FIG. 5C shows a scanning electron microscope (SEM) surface analysis result for the first layer prepared according to Preparation Example 2. Comparing with FIG. 4C, the first layer contained the unzipped CNTs. In the first layer, the unzipped CNTs formed a network structure with pores. The specific surface area and pore volume of the first layer are shown in Table 1 below.

TABLE 1

| Category | Second layer | First layer |
|---|---|---|
| Specific surface area [m²/g] | 194.20 | 234.824 |
| Total pore volume (cm³/g) | 1.593 | 1.157 |

EXAMPLE

A sulfide-based solid electrolyte was compressed into pellets with application of a pressing force in a range of about 13 MPa to 17 MPa. The pellets were put into a mold, and the second layer obtained according to Preparation Example 1 and the first layer obtained according to Preparation Example 2 were sequentially put on the pellets. Through pressurization at about 450 MPa, a structure in which the solid electrolyte layer, the second layer, and the first layer were stacked was obtained. A negative electrode current collector was attached to the remaining surface of the first layer, and a lithium thin film as the counter electrode was attached to the remaining surface of the solid electrolyte layer. Next, a predetermined pressure was applied thereto to prepare a pressed cell.

Comparative Example 1

A pressed cell was prepared in the same manner as in the above Example, except that a first layer was not included as a sheet layer. According to Comparative Example 1, the pressed cell was a laminate of a negative electrode current collector, a second layer, a solid electrolyte layer, and a lithium thin film.

Comparative Example 2

A pressed cell was prepared in the same manner as in the above Example except that a sheet layer was not used. According to Comparative Example 2, the pressed cell was a laminate of a negative electrode current collector, a solid electrolyte layer, and a lithium thin film.

Comparative Example 3

Carbon nanotube powder was dissolved in water, to which a surfactant was added, and filtered to prepare an assembly in a sheet form. The assembly maintained the sheet form by van der Waals forces. The assembly was dried at a constant pressure and temperature with a hot press. The resultant product was laminated to be disposed between a solid electrolyte layer and a negative electrode current collector instead of the sheet layer of the Example to prepare a pressed cell.

Figure 6:
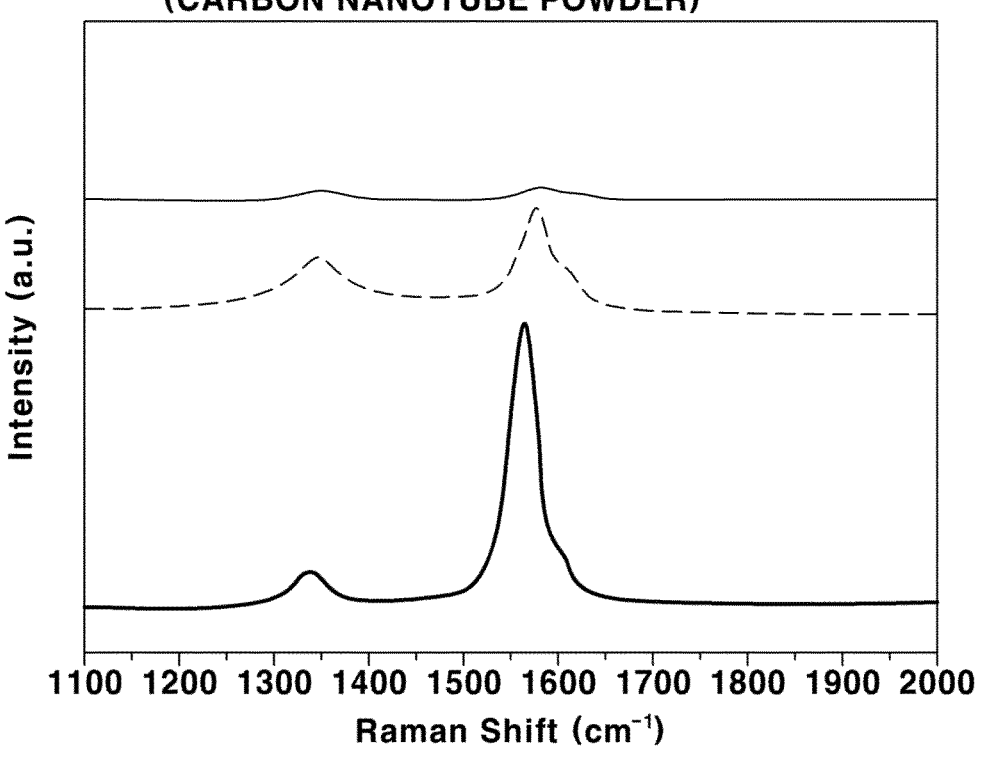
FIG. 6 shows Raman spectroscopy for a second layer according to Preparation Example 1, a first layer according to Preparation Example 2, and an assembly according to Comparative Example.

FIG. 6 is a graph showing the analysis results of Raman spectroscopy for the second layer according to Preparation Example 1, the first layer according to Preparation Example 2, and an assembly according to Comparative Example. The G band refers to a peak generated by Sp2-bonded carbon appearing at about 1585 cm⁻¹. The D band refers to a peak generated by Sp2-bonded carbon appearing at about 1350 cm⁻¹.

The peak intensity ratio ($I_G/I_D$) of each sample is shown in Table 2 below.

TABLE 2

| Category | Preparation Example 1 | Preparation Example 2 | Comparative Example 3 |
|---|---|---|---|
| Peak Intensity Ratio ($I_G/I_D$) | 6.42 | 1.64 | 1.23 |

Comparing the results of Preparation Example 1 and Preparation Example 2, the crystallinity of the second layer prepared according to Preparation Example 1 containing raw carbon nanotubes (CNTs) was higher than that of the first layer prepared according to Preparation Example 2. On the other hand, the peak intensity ratio of the sheet made of the carbon nanotube powder of Comparative Example 3 was the lowest among the three samples.

Figure 7:
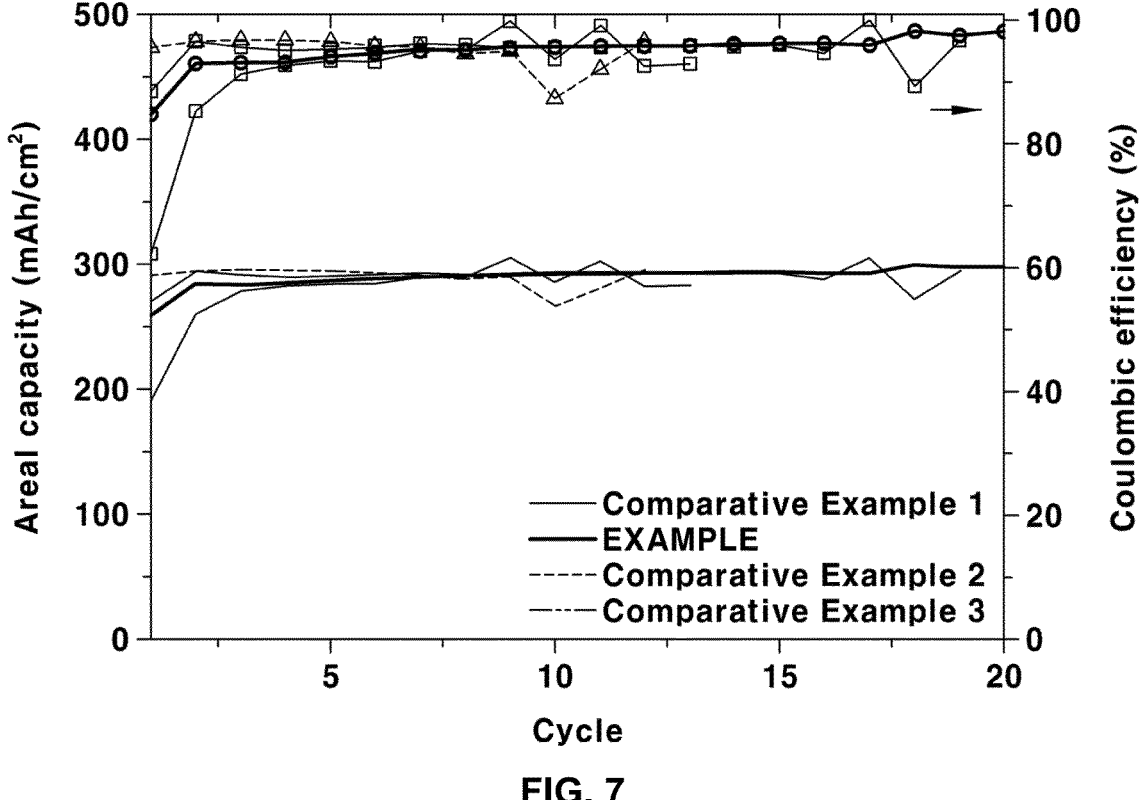
FIG. 7 shows performance evaluation results for pressed cells according to Example and Comparative Examples 1 to 3.

FIG. 7 is a graph showing the performance evaluation results for pressed cells according to Example and Comparative Examples 1 to 3. Each pressed cell was evaluated by being charged and discharged at a temperature of about 50° C. at a charging rate of about 1.0166 mAh/cm² (0.33 C).

Figure 8A:
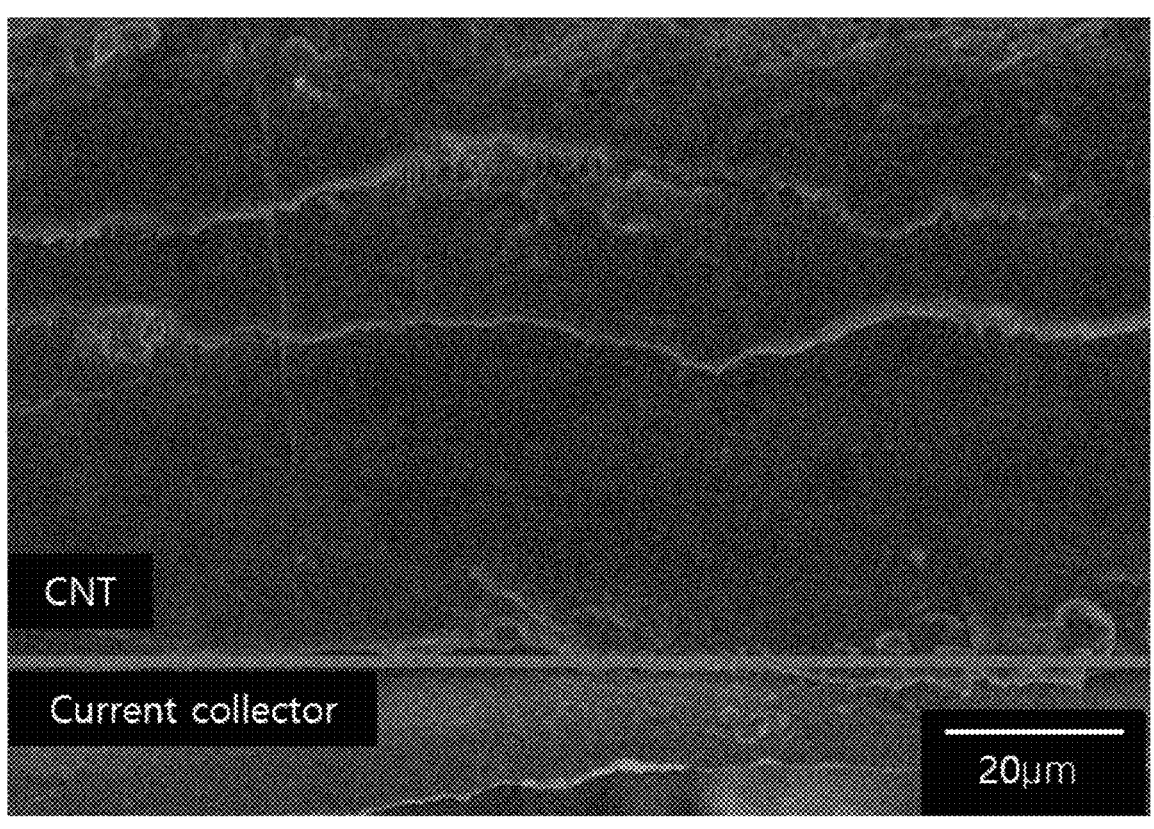
FIG. 8A shows a scanning electron microscope (SEM) image of a cross-section of a pressed cell according to Comparative Example 1.
Figure 8B:
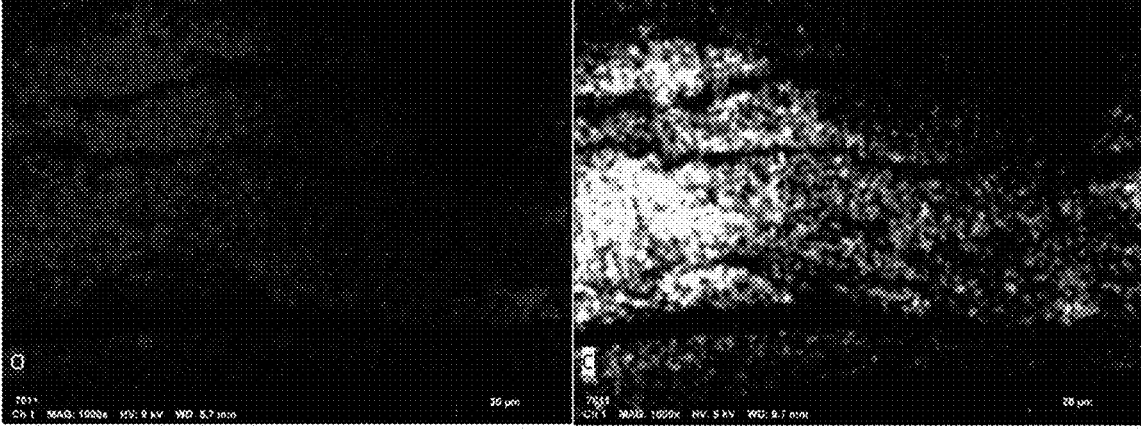
FIG. 8B shows energy dispersive X-ray spectroscopy (EDX) of a cross-section of a pressed cell according to Comparative Example 1.

In Comparative Example 1, the pressed cell was made up of the sheet layer only including the second layer containing the raw CNTs. FIG. 8A is a scanning electron microscope (SEM) image of a cross-section of a pressed cell according to Comparative Example 1. FIG. 8B shows energy dispersive X-ray spectroscopy (EDX) analysis results of a cross-section of a pressed cell according to Comparative Example 1. It was confirmed that in Comparative Example 1, lithium metal was deposited and stored throughout the sheet layer. As a result, a series of layers including lithium metal were highly likely to be formed between the solid electrolyte layer and the sheet layer, which may adversely affect the lifespan of the battery. Referring to FIG. 7, the pressed cell of Comparative Example 1 exhibited unstable performance after about 15 cycles of charging and discharging.

In Comparative Example 2, the pressed cell was prepared without the sheet layer. Lithium metal was deposited and stored between the solid electrolyte layer and the negative electrode current collector. Since the negative electrode current collector had smaller surface area than the sheet layer, the current density per unit area increased and lithium dendrites were excessively formed. When the lithium dendrites penetrated the solid electrolyte, short-circuiting in the battery occurred in the battery. As a result, the pressed cell of Comparative Example 2 was short-circuited after about 12 cycles of charging and discharging.

In Comparative Example 3, the powder cell was made up of the sheet layer made of the carbon nanotube powder. Since the carbon nanotube powder had many edges, which are active regions, lithium trapping was highly likely to occur. In addition, side reactions were highly likely to occur when the carbon nanotube powder came into contact with the solid electrolyte. The pressed cell of Comparative Example 3 exhibited a low initial efficiency of about 62% and stopped operating after about 13 cycles of charging and discharging.

The pressed cell of Example exhibited high initial efficiency of about 80% or more, and maintained uniform performance without significant fluctuation until after about 20 cycles of charging and discharging.

While the present disclosure has been particularly shown and described with reference to exemplary embodiments thereof, it is to be understood that the scope of the present disclosure is not limited to the disclosed exemplary embodiments. Modified forms are also included within the scope of the present disclosure.

What is claimed is:

1. An all-solid-state battery comprising:
   a negative electrode current collector;
   a sheet layer disposed on the negative electrode current collector, wherein the sheet layer comprises carbon nanotubes;
   a solid electrolyte layer disposed on the sheet layer;
   a positive electrode active material layer disposed on the solid electrolyte layer; and
   a positive electrode current collector disposed on the positive electrode active material layer,
   wherein the sheet layer comprises:
   a first layer disposed on the negative electrode current collector and comprising unzipped carbon nanotubes; and
   a second layer disposed on the first layer and comprising raw carbon nanotubes,
   wherein the second layer has a greater peak intensity ratio of G band to D band ($I_G/I_D$) based on Raman spectroscopy than the first layer.

2. The all-solid-state battery of claim 1, wherein the sheet layer has a network structure formed by carbon nanotubes and comprising pores.

3. The all-solid-state battery of claim 1, wherein the sheet layer has a porosity in a range of about 30% to 80%.

4. The all-solid-state battery of claim 1, wherein lithium is deposited and stored in the first layer during a charging process.

5. The all-solid-state battery of claim 1, wherein the first layer has a greater specific surface area than the second layer.

6. The all-solid-state battery of claim 1, wherein the first layer has a specific surface area in a range of about 200 $m^2$/g to 400 $m^2$/g.

7. The all-solid-state battery of claim 1, wherein the second layer has a specific surface area in a range of about 50 $m^2$/g to 200 $m^2$/g.

8. The all-solid-state battery of claim 1, wherein the first layer has a greater lithiophilicity than the second layer.

9. The all-solid-state battery of claim 1, the second layer has a peak intensity ratio ($I_G/I_D$) of the G band to the D band based on Raman spectroscopy in a range of about 4 to 7.

10. The all-solid-state battery of claim 1, the first layer has a peak intensity ratio ($I_G/I_D$) of the G band and the D band based on Raman spectroscopy in a range of about 1 to 2.

11. The all-solid-state battery of claim 1, wherein the first layer has a thickness in a range of about 0.1 μm to 100 μm.

12. The all-solid-state battery of claim 1, wherein the second layer has a thickness in a range of about 0.1 μm to 100 μm.

13. The all-solid-state battery of claim 1, wherein the sheet layer does not comprise a binder.

14. The all-solid-state battery of claim 1, wherein the sheet layer is a self-standing type.

15. A vehicle comprising an all-solid-state battery of claim 1.

* * * * *